(12) United States Patent
Biessener et al.

(10) Patent No.: US 7,185,169 B2
(45) Date of Patent: Feb. 27, 2007

(54) VIRTUAL PHYSICAL DRIVES

(75) Inventors: David W Biessener, Woodbury, MN (US); Gaston R Biessener, St. Paul, MN (US)

(73) Assignee: Voom Technologies, Inc., Lakeland, MN (US)

( * ) Notice: Subject to any disclaimer, the term of this patent is extended or adjusted under 35 U.S.C. 154(b) by 860 days.

(21) Appl. No.: 10/134,656

(22) Filed: Apr. 26, 2002

(65) Prior Publication Data

US 2003/0204700 A1 Oct. 30, 2003

(51) Int. Cl.
*G06F 12/10* (2006.01)
*G06F 12/02* (2006.01)

(52) U.S. Cl. .................. 711/202; 711/200; 711/203; 711/206; 711/207; 711/209; 711/165; 710/205

(58) Field of Classification Search ........ 711/202–203, 711/163–164
See application file for complete search history.

(56) References Cited

U.S. PATENT DOCUMENTS

| | | | |
|---|---|---|---|
| 4,473,878 A * | 9/1984 | Zolnowsky et al. | ........ 711/208 |
| 4,819,154 A | 4/1989 | Stiffler et al. | |
| 4,947,477 A | 8/1990 | Little | |
| 4,959,774 A | 9/1990 | Davis | |
| 5,212,784 A | 5/1993 | Sparks | |
| 5,269,022 A | 12/1993 | Shinjo et al. | |
| 5,335,334 A * | 8/1994 | Takahashi et al. | ........ 711/164 |
| 5,357,509 A | 10/1994 | Ohizumi | |
| 5,469,573 A | 11/1995 | McGill, II et al. | |
| 5,487,160 A | 1/1996 | Bemis | |
| 5,572,659 A | 11/1996 | Iwasa et al. | |
| 5,603,008 A * | 2/1997 | Hilton et al. | ............... 711/164 |
| 5,724,501 A | 3/1998 | Dewey et al. | |
| 5,740,397 A | 4/1998 | Levy | |
| 5,742,792 A | 4/1998 | Yanai et al. | |
| 5,758,050 A * | 5/1998 | Brady et al. | .................. 714/1 |
| 5,758,057 A | 5/1998 | Baba et al. | |
| 5,777,874 A | 7/1998 | Flood et al. | |
| 5,799,141 A | 8/1998 | Galipeau et al. | |

(Continued)

OTHER PUBLICATIONS

AEleen Frisch, Essential Windows NT System Administration, O'Reilly & Associates, 1998, pp. 120-131, 166-169.

(Continued)

*Primary Examiner*—Matthew Kim
*Assistant Examiner*—Zhuo H. Li
(74) *Attorney, Agent, or Firm*—Shumaker & Sieffert, P.A.

(57) ABSTRACT

A system includes a processor, a storage system having one or more physical storage devices, and a controller coupled to the processor and the storage system. The controller maintains a virtual physical drive (VPD) map that defines a set of virtual physical drives, and maps the virtual physical drives to storage media of the physical storage devices. The controller receives access requests from the processor and controls the physical storage media according to the VPD map such that the virtual physical drives appear to the processor as physically independent drives. The controller provides hardware-level security to prevent unauthorized access by the processor or any software application executing on processor. In addition, the controller may maintain primary virtual storage and secondary virtual storage within the virtual physical drives, and may dynamically reallocate the virtual storage to backup and restore data in a manner that appears almost instantaneous to the user.

36 Claims, 14 Drawing Sheets

U.S. PATENT DOCUMENTS

| | | | |
|---|---|---|---|
| 5,829,045 A | 10/1998 | Motoyama | |
| 5,829,046 A | 10/1998 | Tzelnic et al. | |
| 6,000,020 A | 12/1999 | Chin et al. | |
| 6,038,639 A | 3/2000 | O'Brien et al. | |
| 6,044,444 A | 3/2000 | Ofek | |
| 6,047,294 A | 4/2000 | Deshayes et al. | |
| 6,081,875 A | 6/2000 | Clifton et al. | |
| 6,269,431 B1 | 7/2001 | Dunham | |
| 6,324,627 B1 | 11/2001 | Kricheff et al. | |
| 6,366,987 B1 | 4/2002 | Tzelnic et al. | |
| 6,434,681 B1 | 8/2002 | Armangau | |
| 6,477,612 B1 * | 11/2002 | Wang | 711/2 |
| 6,532,527 B2 | 3/2003 | Selkirk et al. | |
| 6,549,992 B1 | 4/2003 | Armangau et al. | |
| 6,557,089 B1 | 4/2003 | Reed et al. | |
| 6,633,916 B2 | 10/2003 | Kauffman | |
| 6,708,227 B1 | 3/2004 | Cabrera et al. | |
| 6,792,519 B2 * | 9/2004 | Constable et al. | 711/163 |
| 2002/0032850 A1 | 3/2002 | Kauffman | |
| 2002/0053009 A1 | 5/2002 | Selkirk et al. | |
| 2002/0103982 A1 | 8/2002 | Ballard et al. | |
| 2002/0144044 A1 | 10/2002 | Moon et al. | |
| 2002/0199073 A1 | 12/2002 | Tamura et al. | |
| 2003/0005248 A1 | 1/2003 | Selkirk et al. | |
| 2003/0014605 A1 | 1/2003 | Slater et al. | |
| 2003/0018657 A1 | 1/2003 | Monday | |
| 2003/0023673 A1 | 1/2003 | Tso | |
| 2003/0061456 A1 | 3/2003 | Ofek et al. | |
| 2003/0131112 A1 | 7/2003 | Yu | |

OTHER PUBLICATIONS www.tigerdirect.com; Catalog Excerpt, Date Unknown, p. 92XKD; Showing GOBACK Utilities Software.

* cited by examiner

▨ = PRIMARY VIRTUAL STORAGE
☰ = SECONDARY VIRTUAL STORAGE

VIRTUAL PHYSICAL DRIVES

TECHNICAL FIELD

This invention relates generally to data storage and, more particularly, to backup and restoration of a storage device.

BACKGROUND

Typical computing environments include one or more computing devices, such as desktop computers, laptop computers, hand-held computers, database servers, file servers, web servers, supercomputers, and the like. Each of these devices typically includes one or more processors, and one or more storage drives having storage media for storing data and executable software modules.

The loss of data due to an unforeseen event is of paramount concern to organizations or other computer users. The data may be lost, for example, by fire, flood, and other natural disasters, hardware failure, and even software viruses or other hostile network attacks. To mitigate the risk of loss, due to an unforeseen event, organizations typically make use of an archival and retrieval system to periodically backup the data. These systems may include a number of backup devices including remote storage devices, tape drives, optical jukeboxes and the like.

A backup operation is typically performed by one of a number of different commercially available software programs. The software programs often run on a computer coupled to a network of computers, and tend to consume network bandwidth when saving the data to a backup device. Consequently, these programs tend to require considerable time to backup critical data, and can often consume significant computing and network resources. Furthermore, the software program responsible for the backup and restoration may be subject to viruses or other network attacks, thereby increasing the risk to the organization.

SUMMARY

In general, the invention is directed to techniques that present one or more underlying physical drives as virtual physical drives to a processor, and provide hardware-level security for preventing unauthorized access to the virtual physical drives. The techniques also provide dynamic virtual storage within the virtual physical drives to save and restore data within a computing environment. The system may include a controller that generates and maintains a virtual physical drive (VPD) map that associates addressable storage units of a set of virtual physical drives to addressable storage units of a set of physical storage media. In other words, the controller may define and map one or more virtual physical drives to the storage address of one or more physical drives.

The controller responds to storage access requests from a processor of a host computer such that the virtual physical drives appear to the processor as physically independent drives. For example, the controller may present a unique drive identifier for each of the virtual physical drives. Furthermore, the controller assigns each virtual physical drive one or more address ranges for storage units, and maps the address ranges to the physical storage media. The controller translates access requests for the virtual physical drives to the associated storage units of the physical media in accordance with the mapping.

The controller may also allocate primary virtual storage and secondary virtual storage for use in dynamically saving and restoring data written to the virtual physical drives. In particular, the controller uses the primary virtual storage of a given virtual physical drive to store an initial state of data written by a computing device prior to a point in time, referred to herein as time $T_0$. In other words, the primary virtual storage stores a complete image of the data at time $T_0$. The controller uses the secondary virtual storage to store all data written by the computing device subsequent to time $T_0$. Consequently, the controller responds to read requests received from the computing device by selectively reading data from the secondary virtual storage and the primary virtual storage, depending on whether data stored by the primary virtual storage has been rendered obsolete by data stored by the secondary virtual storage.

The controller provides the ability to quickly create a new complete image of the data on any virtual physical drive by dynamically reallocating the primary virtual storage and the secondary virtual storage of the drive. In particular, the controller maintains for a map that defines the allocation of the primary and secondary virtual storage of the drive. By adjusting the map, the controller can quickly reallocate the primary virtual storage of the virtual physical drive to include the data written to the secondary virtual storage, thereby establishing a new time $T_0$ for the primary virtual storage. In this manner, the controller can backup data in a manner that appears almost instantaneous to the user.

In one embodiment, a method comprises mapping addressable storage units of a set of virtual physical drives to addressable storage units of a set of physical storage media; and responding to storage access requests from a processor of a host computer such that the virtual physical drives appear to the processor as physically independent drives.

In another embodiment, a method comprises mapping addressable storage units of a set of virtual physical drives to addressable storage units of a set of physical storage media, and intercepting access requests on an interface bus from a processor of a host computer to access the storage units of the virtual physical drives, wherein each access request specifies one or more addresses for one of the virtual physical drives. The method further includes translating the specified addresses to addresses for the physical storage media in accordance with the mapping; and issuing access requests to access the set of physical storage media in accordance with the translated addresses.

In another embodiment, a method comprises generating a virtual physical drive (VPD) map that associates addressable storage units of a virtual physical drive to addressable storage units of a physical storage medium, and generating a virtual storage map (VSM) to allocate a primary virtual storage and a secondary virtual storage within the virtual physical drives. The method further comprises maintaining a record of the data written to the secondary virtual storage, and selectively reading data from the primary virtual storage and the secondary virtual storage based on the record.

In another embodiment, an apparatus comprises a control unit and a computer-readable medium to store a virtual physical drive (VPD) map that associates addressable storage units of a set of virtual physical drives to addressable storage units of a set of physical storage media of a storage system. The apparatus further comprises a first interface to couple the control unit to a processor of a host computer via a bus, and a second interface coupling the control unit to the storage system. The control unit receives storage access requests from the processor and controls the physical storage media according to the VPD map such that the virtual physical drives appear to the processor as physically independent drives.

The invention provides a number of advantages. For example, the controller can provide hardware-level security to prevent unauthorized access of the virtual physical drives by the processor or any software application executing on processor, such as viruses. The virtual physical drives may appear as one or more separate independent drives even though the storage system comprises a single storage device.

In addition, the invention provides the ability to quickly backup and restore data for any virtual physical drive by dynamically reallocating virtual storage, such as by adjusting a respective virtual storage map associated with the virtual physical drive. In this manner, the controller can backup and restore data in a manner that appears almost instantaneous to the user.

Another advantage is that any of the virtual physical drives may be presented to the processor as read-only drives. Furthermore, the controller may present the primary virtual storage or the secondary virtual storage of a VPD, or any combination thereof, as a separate VPD in writable or read-only form. This may be useful for selectively restoring data from secondary virtual storage to the primary virtual storage in a secure fashion.

Consequently, the controller may be used to provide a secure means for saving and restoring data that is not susceptible to malicious network users, viruses, or other such devices. In addition, the controller may provide a dedicated hardware interface for saving and restoring data that is physically separate from the computing device and the software executing thereon. A user, such as a system administrator, may save and restore the data by actuating a hardware switch or interacting with the controller via a secure dedicated connection or wireless link.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
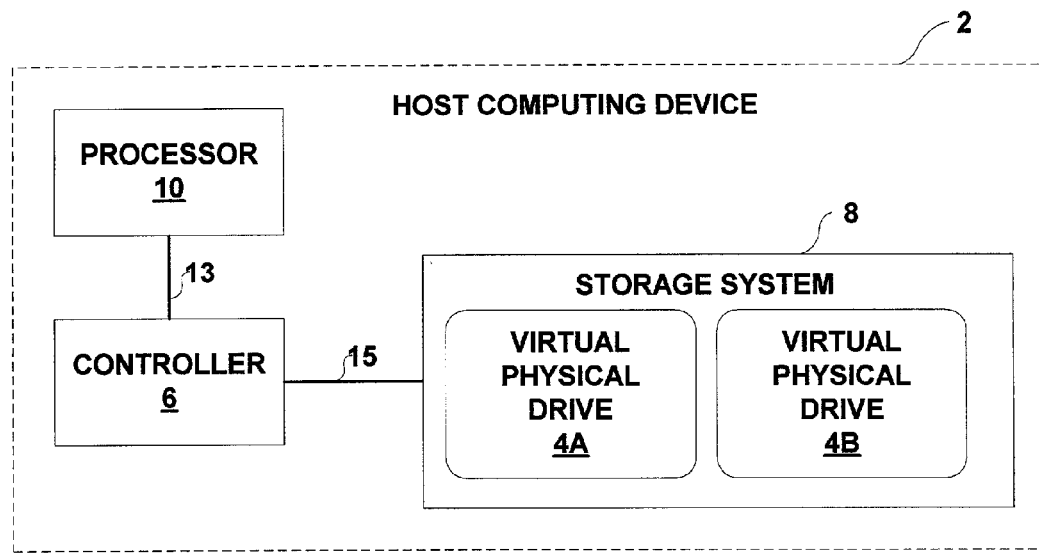
FIG. 1 is a block diagram illustrating an example system in which a controller presents virtual physical drives to a processor of a host computer.

FIG. 1 is a block diagram illustrating an example host computing device 2 having "virtual physical drives" 4A, 4B (herein VPDs 4). As described in detail, controller 6 controls VPDs 4 such that the VPDs appear to processor 10, as well as any software application or operating system executing on processor 10, as N physically separate drives. VPDs 4, however, may actually be associated with M physical storage devices, where N and M are greater than or equal to one and need not be equal. For example, VPDs 4 may appear as one or more separate independent drives even though storage system 8 comprises a single storage device. As another example, VPDs 4 may appear as one or more separate independent drives even though storage system 8 comprises a multiple storage devices. In this manner, VPDs 4 may, for example, be allocated to physically separate storage mediums of separate devices, or may be allocated to on a common storage medium within a storage device.

Processor 10 may be any type of programmable processor operating within a host computing device or other device. Processor 10 may operate within, for example, a desktop computer, a laptop computer or a network server, such as a file server, a web server or a database server. In addition, processor 10 may be an embedded processor operating within a network or stand-alone appliance.

Storage system 8 provides a system for storing data and executable software modules for use by processor 10. Storage system 8 may comprise, for example, one or more physical storage devices including one or more hard disks, tape drives, removable storage media, optical storage media, volatile storage memory, EEPROM and the like.

Host computing device 2 includes a controller 6 coupled between processor 10 and storage system 8. Controller 6 receives storage access requests, such as conventional read and write requests, from processor 10 via interconnect 13. In response, controller 6 manages storage system 8 by issuing commands to storage system 8 via interconnect 15. Interconnects 13, 15 may conform to, for example, the Small Computer System Interface (SCSI), Internet Small Computer System Interface (iSCSI), a Fiber Channel interface, Integrated Drive Electronics/AT Attachment (IDE/ATA) interface, Serial ATA (SATA), or the like. Storage system 8 may include one or more physical storage media, such as a conventional magnetic disk drives, magneto optical storage devices, and CDROMS.

As described in detail below, controller 6 maintains a virtual physical drive (VPD) map that allocates a number of virtual physical drives within one or more physical drives of storage system 8. In particular, the VPD map defines a number of addressable storage units for each of VPDs 4, and associates the storage units with addressable storage units of the underlying physical media of storage system 8.

Controller 6 manages storage system 8 to present VPDs 4 to processor 4 as if each of VPDs 4 were physically separate, independent drives. Controller 6 receives commands and other access requests from processor 6 via interconnect 13, and responds as if the VPDs were physically separate drives. For example, controller 6 may present VPDs as having different drive identifiers, storage capacities, and other parameters. Furthermore, the controller translates access requests for VPDs 4 to the associated storage units of the physical media of storage system 8 in accordance with the VPD map.

Controller 6 may selectively present individual or groups of VPDs 4 to processor 10 depending on a current configuration of host computer 2. For example, for any current configuration, any number of VPDs 4 may be "offline" and inaccessible to processor 4, while other VPDs 4 may be "online." Controller 6 provides hardware-level security to ensure that the offline VPDs 4 cannot be accessed by processor 10, or any software application executing on processor 10, including an operating system. As such, controller 6 protects the offline VPDs from inadvertent modification by a user, corruption via malicious software, such as a virus, and the like.

In addition, controller 6 may further manage storage system 8 to provide a secure backup for data written by processor 10. Moreover, controller 6 provides mechanisms to backup and restore data in a manner that appears instantaneous to a user. In particular, within any number of VPDs 4, controller 6 may allocate and maintain a primary virtual storage and a secondary virtual storage, collectively referred to as virtual storage. Controller 6 may allocate the virtual storage within one or more of the VPDs 4 presented by controller 6. Alternatively, controller 6 may allocate the virtual storage according to logical storage volumes that are mapped to the underlying virtual physical drives by an operating system executing on processor 10.

Figure 2:
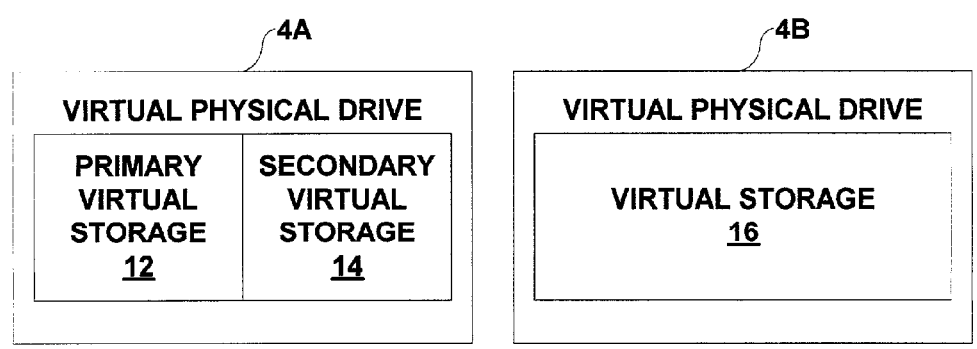
FIG. 2 is a block diagram illustrating an exemplary configuration of virtual physical drives.

FIG. 2 is a block diagram illustrating an exemplary configuration of virtual physical drives 4A, 4B of FIG. 1. In this example configuration, controller 6 has allocated within VPD 4A a primary virtual storage 12 and a secondary virtual storage 14. Controller 6 has allocated a single virtual storage 16 within VPD 4B. This configuration may be useful, as described in more detail below, for workstations or laptop computers in that software application can be stored on VPD 4A and data files stored on VPD 4B. Although illustrated for exemplary purposes with reference to two VPDs 4A, 4B, any number of VPDs within storage system 8 can be configured for backup and restoration according to the techniques described herein.

Controller 6 uses primary virtual storage 12 to store an initial state of data written by processor 10 to VPD 4A prior to a point in time, referred to herein as time $T_0$. In other words, primary virtual storage 12 stores a complete image of the data at time $T_0$. Controller 6 uses secondary virtual storage 14 to store all data written by processor 10 subsequent to time $T_0$. Consequently, controller 6 responds to read requests for VPD 4A received from processor 10 by selectively reading data from secondary virtual storage 14 and the primary virtual storage 12, depending on whether data stored by primary virtual storage 12 has been rendered obsolete by data stored by secondary virtual storage 14. In order to respond to a read request, controller 6 determines whether the requested data has been written to primary virtual storage 12, or has been superceded by data written to secondary virtual storage 14. Controller 6 then selectively reads data from secondary virtual storage 14 and primary virtual storage 12 in response to the read request.

In order to quickly and efficiently backup and restore data, controller 6 dynamically allocates and reallocates virtual storage 12, 14 of VPD 4A. In particular, controller 6 maintains a virtual storage map (VSM) that defines the allocation of the primary and secondary virtual storage 12, 14 within VPD 4A. Controller 6 may maintain the map within internal embedded memory, within storage system 8, or both. In response to a save (backup) command, controller 6 updates the VSM, dynamically reallocating primary virtual storage 12 to include the data written to secondary virtual storage 14. Consequently, controller 6 dynamically reallocates secondary virtual storage 14 to exclude the data. In this manner, controller 6 quickly establishes a new time $T_0$ in which primary virtual storage 12 stores all of the data received prior to time $T_0$. In this manner, controller 6 can save (backup) the data in the manner that appears instantaneous to a user. Specifically, by dynamically allocating and reallocating virtual storage 12, 14 of VPD 4A upon receiving the save command, controller 6 avoids copying any of the actual data in order to perform a backup.

In addition to the ability to save data in a manner that appears instantaneous to a user, controller 6 can also revert back to the previously saved state in similar fashion. Specifically, upon receiving a restore command, controller 6 can simply disregard the data written to secondary virtual storage 14, thereby reverting to the data stored by primary virtual storage 12. In this manner, controller 6 can quickly revert to using data stored prior to a time $T_0$.

Controller 6 may present VPDs to processor 4 as read-only drives. Furthermore, controller 6 may present primary virtual storage 12 or secondary virtual storage 14 of a given VPD, or any combination thereof, as a separate VPD in writable or read-only form. This may be useful for selectively restoring data from secondary virtual storage to the primary virtual storage in a secure fashion.

Furthermore, controller 6 may provide additional security by filtering any unauthorized commands received from processor 10. Controller 6 may, for example, filter unpublished, vendor-specific commands received from processor 10. In addition, controller 6 may filter published but unwanted commands, or may translate the unwanted command to an acceptable command. Controller 6 may selectively filter the commands based on configuration information defined by a user, such as a system administrator. In this manner, controller 6 may provide a bus-level filter for access commands issued to storage system 8.

Figure 3:
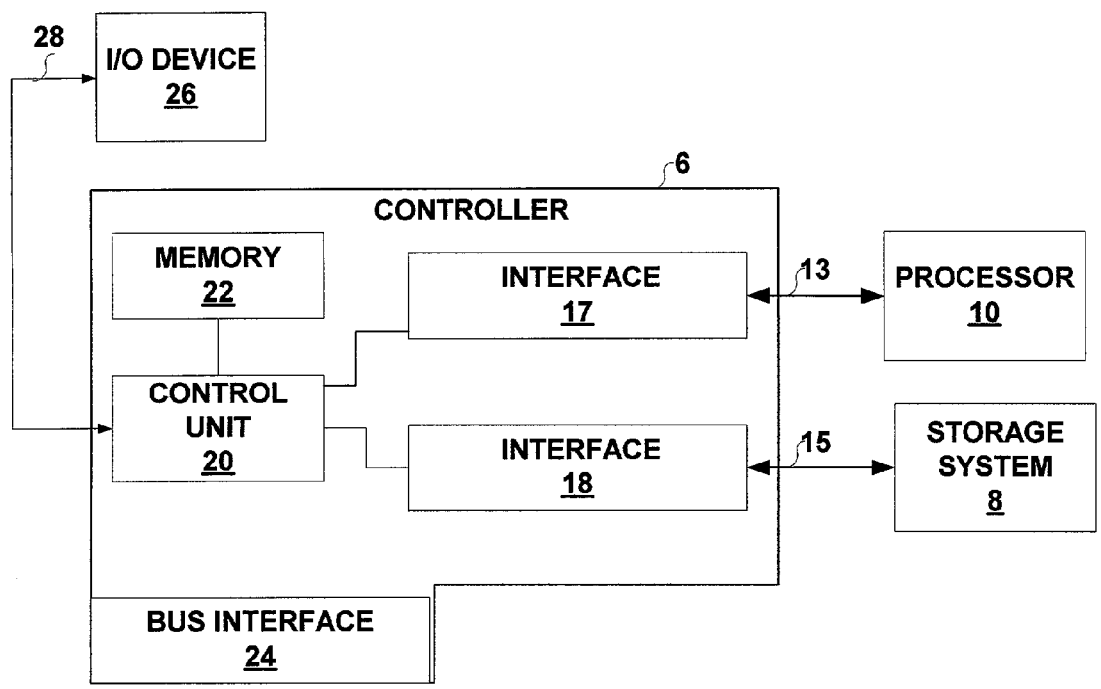
FIG. 3 illustrates an example embodiment of a controller implemented as a single printed circuit board that may be embedded within a host computing device.

FIG. 3 illustrates an example controller 6 implemented as a single printed circuit board that may be embedded within a host computing device. In this embodiment, controller 6 may include first interface 17, second interface 18, control unit 20, embedded memory 22 and bus interface 24. First interface 17 and second interface 18 provide mechanisms for coupling controller 6 between processor 10 and storage system 8, respectively. Specifically, control unit 20 receives storage access commands from processor 10 via interconnect 13 and first interface 17. In addition, control unit 20 manages and accesses storage system 8 via interconnect 15 and second interface 18. Although illustrated as implemented on a printed circuit board, controller 6 may be embedded within a motherboard along with processor 10, within storage system 8, or within other components of system 2 disposed between processor 10 and storage system 8.

Control unit 20 maintains the virtual physical drive (VPD) map that allocates a number of virtual physical drives within one or more physical drives. In addition, for each VPD configured for backup and restoration, control unit 20 maintains a virtual storage map (VSM) that describes a current allocation of primary virtual storage 12 and secondary virtual storage 14 within storage system 8. In addition, control unit 20 may, as described below, store other information including a record of the locations of secondary virtual storage 14 to which data has been written. Control unit 20 may store the VPD map, the VSMs, if any, and other information within memory 22. Alternatively, control unit 20 may store the VPD map, VSMs, and other information within storage system 8 for persistency, or within both memory 22 and storage system 8 for purposes of redundancy.

Control unit 20 may also receive data backup and restoration commands directly from I/O device 26. In particular, I/O device 26 may be a dedicated device by which a user issues commands to controller 6, thereby bypassing processor 10. In this manner, I/O device 26 and controller 6 provide a secure means for saving and restoring data within storage system 8. Consequently, controller 6 and storage system 8 are not subject to attacks via network hackers, viruses or other malicious software.

I/O device 26 may comprise a keyboard, pointing device or other conventional input mechanisms. In one embodiment, I/O device 26 comprises a panel mounted to a host computing device. Alternatively, I/O device 26 may comprise a dedicated communication link or wireless device by which a user, such as a network administrator, may save and restore data within storage system 8. In this embodiment, signals 28 may represent wireless communications received by controller 6 from I/O device 26.

Alternatively, controller 6 may receive commands, such as save and restore commands, from bus interface 24, interface 17, or combinations thereof. Bus interface 24 provides a mechanism with which controller 6 may electrically coupled to a data communications bus for additional communications with processor 10 within host computing device 2. Bus interface 24 may, for example, comprise a PCI bus. Alternatively, bus interface 24 may simply provide power and ground signals for use by controller 6.

Although illustrated for exemplary purposes as a single printed circuit board, controller 6 may be readily incorporated within a bus controller, such as a bus controller residing on a motherboard within host computer 2. In this embodiment, interfaces 17, 18 may be combined into a single interface. In other words, controller 6 manages bus communications between processor 4 and storage system 8. This embodiment may offer one or more advantages, such as reduced communication latency, reduced redundancy of bus control logic, improved communication efficiency, and the like. Similarly, controller 6 may be incorporated within a controller on storage system 8.

Figure 4A:
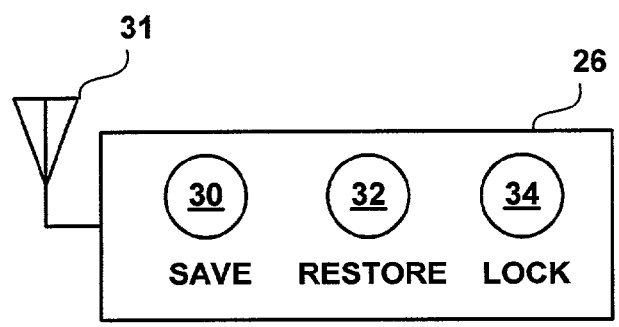
FIG. 4A illustrates an example embodiment of an input/output (I/O) device for issuing save and restore commands to the controller.

FIG. 4A illustrates an example embodiment of an I/O device 26 comprising an I/O panel mounted to host computing device 2. In the illustrated embodiment, I/O device 26 includes a save button 30, a restore button 32, and a lock button 34, Actuation of save button 30 causes I/O device 26 to issue a save command to control unit 20 of controller 6. In response, controller 6 saves one or more of "online" virtual physical drives that are configured for data backup and restoration.

Similarly, actuation of restore button 32 causes I/O device 26 to issue a restore command to controller 6. In response, controller 6 restores one or more of the "online" virtual physical drives that are configured for data backup and restoration. Lock button 34 may be used to prevent controller 6 from performing an unauthorized or accidental save or restore operation. Specifically, actuation of lock 34 may prevent controller 6 from responding to a save command or restore command until specifically unlocked.

I/O device 26 may include other features such as a display of the last date and time at which a save was performed. In addition, I/O device 26 may include mechanisms by which a user enters an authorization code or provides other secure information such as a digital key to be used for authenticating the user.

I/O device 26 need not be directly coupled to the host computing device device. For a wireless device, I/O device 26 may include antenna 31 to communicate with controller 6 via radio frequency or other appropriate mechanisms. I/O device 26 and controller 6 may be configured to communicate, for example, via cellular or infrared communications or may be enabled as BLUETOOTH, 802.11(a), 802.11(b), or other wireless applications. Alternatively, I/O device may comprise a removable panel that engages controller 6 via an I/O port of other communication means.

Figure 4B:
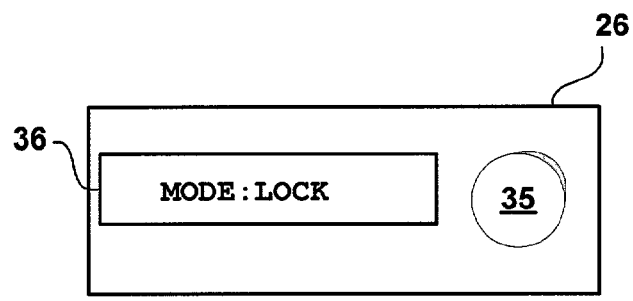
FIG. 4B illustrates another example embodiment of an input/output (I/O) device for issuing save and restore commands to the controller.

FIG. 4B illustrates another example embodiment in which I/O device 26 includes a display area 36 and an input dial 35. Controller 6 displays status information and a current operating mode within display area 36. By interacting with dial 35, a user may perform a number of operations including a restore or a save operation. In addition, the user may place controller 6 in a mode for receiving field upgrades to internal operating software. In one embodiment, controller 6 initializes to a safe mode, i.e., LOCKED, upon power-up, thereby requiring user interaction with dial 35 prior to processing SAVE or RESTORE commands for the virtual drives. In this manner, controller 6 provides a security mechanism in the event that controller 6 accepts SAVE and RESTORE commands from software executing on processor 10 or a remote computing device.

Figure 5:
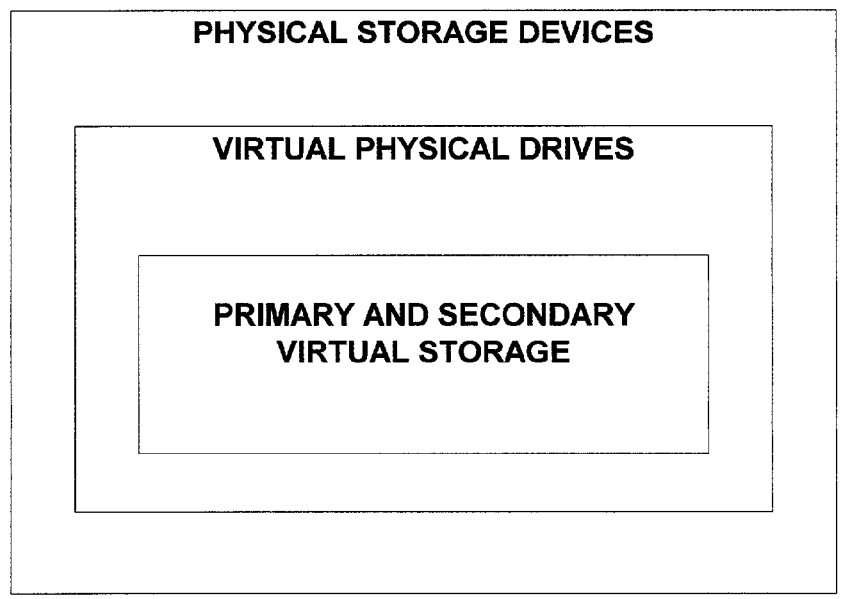
FIG. 5 is a block diagram illustrating the relationship of virtual storage, virtual physical drives, and the underlying physical storage devices having physical storage media.

FIG. 5 is a block diagram illustrating an exemplary arrangement of, and relationship between virtual storage, virtual physical drives, and the underlying physical storage devices having physical storage media. Controller 6 may manage the virtual storage associated with each virtual physical drive as primary and secondary virtual storage for instant backup and restoration.

The physical storage media may comprise one or more distinct hard disks, magnetic tape drives, removable storage media, optical storage devices, FLASH memory devices, or the like. Controller 6 maps one or more VPDs onto the physical storage media. Controller 6 translates access requests from processor 10 according to the mapping such that the VPDs appear as physically separate, independent drives to processor 10. Controller 6 may selectively present individual or groups of VPDs 4 to processor 10 depending on a current configuration of processor 10.

Within each of VPDs 4, controller 6 may define and maintain virtual storage. In particular, controller 6 may allocate and dynamically reallocate primary virtual storage and secondary virtual storage within the virtual physical drives to save and restore the VPDs 4 in a manner that appears substantially instant to the user.

Although not illustrated, because the virtual physical drives appear as physical drives, a number of logical storage volumes may then be defined and mapped upon the virtual storage drives. For example, processor 10, or an operating system executing thereon, may group the virtual storage drives into a single logical storage volume, or multiple logical storage volumes. Similarly, a single logical storage volume may be mapped to multiple physical storage devices.

Figure 6:
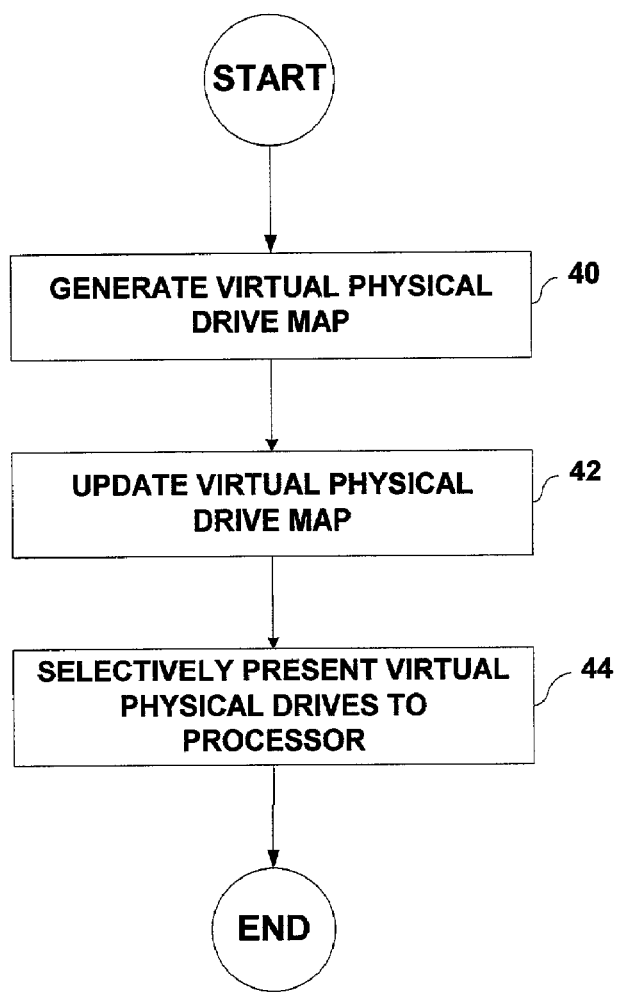
FIG. 6 is a flowchart illustrating a high-level overview of the virtual physical drive features of controller.

FIG. 6 is a flowchart illustrating a high-level overview of the virtual physical drive features of controller 6. Initially, controller 6 generates the VPD map that associates one or more virtual physical drives and physical storage media of storage system 8 (40). In particular, the mapping associates addressable storage regions of the physical storage media with addressable storage addresses of the virtual physical drives.

Accordingly, controller 6 allows an arbitrary number of virtual physical drives to be defined and mapped to one or more physical storage media. The number of "online" virtual physical drives, however, can be subject only to any limitations of the interface protocol used by processor 10. For example, currently versions of the ATA interface support a maximum of two physical drives. Accordingly, in this ATA environment, controller 6 can be configured to map a plurality of VPDs to a physical drive, and may present any combination of two or less of the VPDs as "online" to processor 10 at any given time.

In one embodiment, the VPD map defines for each VPD starting and ending logical block addresses (LBAs) as presented by the physical drive. For example, for a physical drive having 0–9999 LBAs, the VPD map may allocate LBAs 0–4999 to a first VPD, and LBAs 5000–9999 to a second VPD. The allocation between VPDs, however, need not be equal, and controller 6 may allocate to any portion of the addressable storage space presented by the physical drives to a VPD. Furthermore, the mapping of VPDs to the physical storage media need not be contiguous. In other words, the VPD map may maintain a plurality of LBA ranges for each VPD, allowing controller 6 to allocate the LBAs of the physical storage media as necessary to support the requested configuration.

Controller 6 may further update and maintain the VPD map to reflect any changes requested by an authorized user (42). For example, in response to a user request, controller 6 may allocate a new VPD within the physical storage space presented by storage system 8. Similarly, controller 6 may remove a VPD in response to a user request.

Controller 6 may selectively present individual or groups of VPDs 4 to processor 10 depending on a current configuration of host computer 2 (44). For example, for any current configuration, any number of VPDs 4 may be "offline" and inaccessible to processor 10, while other VPDs 4 may be "online." Controller 6 may, for example, execute VPD boot software prior to the booting on an operating system executing on processor 10. The VPD boot software may allow the user to select a desired group of VPDs, including a VPD from which to boot. The VPD boot software may require a valid user identifier, password, or other authentication.

In addition, controller 6 supports the dynamic addition or removal of VPDs after booting. For example, controller 6 may designate a VPD as a removable device that can be "hot swapped," i.e., plugged or unplugged during operation of processor 10. The user may initiate a hot swapping of a VPD by interacting with the operating system, as with conventional removable devices. In response, controller 6 may designate the VPD as accessable or inaccessible, depending upon the request. Controller 6 may request a valid user identifier, password, or other authentication prior to allowing access to the VPD.

As an example, consider the situation where the interface protocol between processor 10 and controller 6 limits the number of "on-line" physical drives to two. In this environment, a user may define an arbitrary number of VPDs, of which only two can be online at a give time. Accordingly, the user may define a single boot VPD, and may configure the other VPDs as removable drives. In this configuration, the user may selectively "swap" the VPDs to access different physical drives. Controller 6 maintains the VPDs as if they were physically separate, thereby prevent corruption of any offline drives via software executing on processor 10. The user may, for example, configure one or more swappable drives for use by family members. The user may configure other drives to store work, financial, legal or other important files. Accordingly, controller 6 provides hardware level security to prevent a virus from corrupting any of the data of an offline VPD, even though the VPDs may be allocated to the same physical storage device. Furthermore, as described in detail below, each VPD may be individually configured for substantially instant save and restore.

Figure 7:
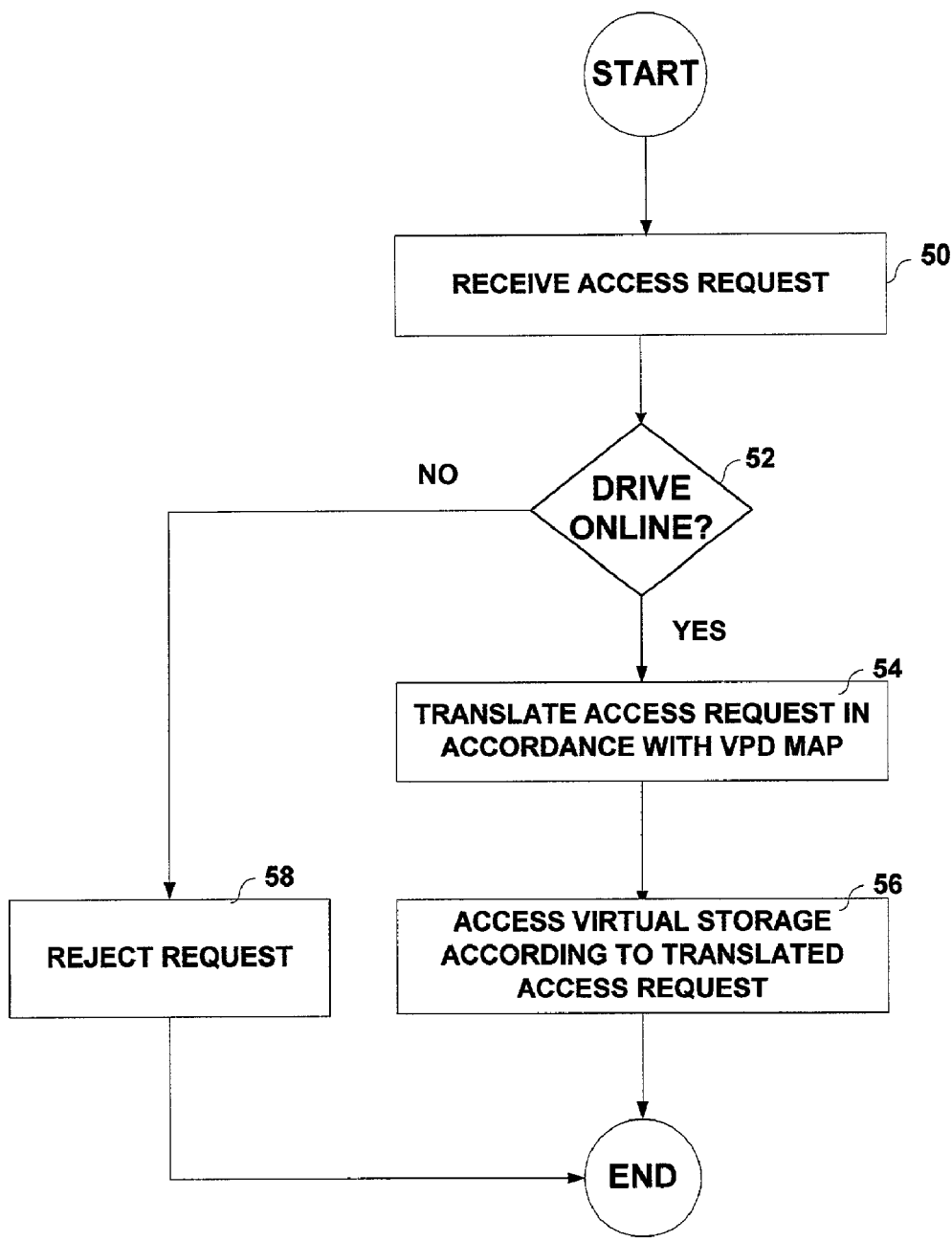
FIG. 7 is a flowchart illustrating exemplary operation of the controller when servicing a storage access request.

FIG. 7 is a flowchart illustrating operation of controller 6 when servicing a storage access request. Initially, controller 6 receives a storage access request from processor 10 to access storage units of one of the virtual physical drives (50). For example, processor 10 may issue a request to access one or more logical address blocks. In this sense, processor 10 is unaware that the VPDs are virtual drives.

Upon receiving the request, controller 6 determines whether the requested drive is currently online, i.e., whether the current user is authorized to access the VPD (52). If not, controller 6 rejects the access request (58). Furthermore, processor 4 will likely be unaware of VPDs that are offline. Therefore, processor 4 will be unlikely to attempt access to the offline VPDs. In any event, controller 6 will similarly reject such requests.

If the requested drive is online, controller 6 translates the requested addresses of the VPD to the addressable storage units of the physical storage devices (54). For example, processor 10 may issue a storage access request for logical address block 1000 of drive 3. Controller 6 translates the request to a respective logical address block of the actual physical drive. Controller 6 issues one or more commands to access the physical drive of storage system 8 in accordance with the translated addresses (56).

Figure 8:
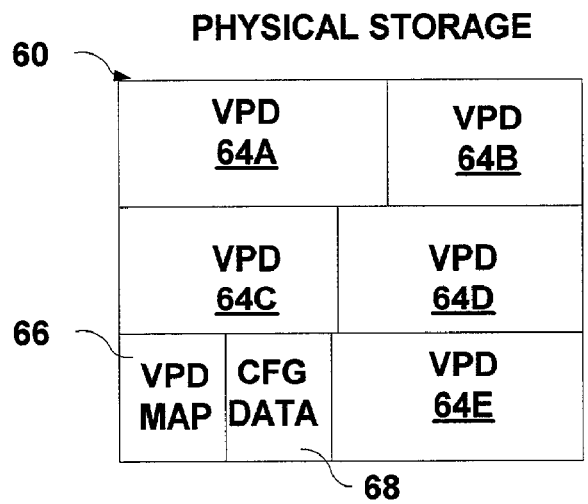
FIG. 8 is a block diagram illustrating an example allocation of storage area of one or more physical devices of a storage system.

FIG. 8 is a block diagram illustrating an example allocation of the storage area 60 of one or more physical devices of storage system 8. In this example, controller 6 allocates VPDs 64A–64E within the physical storage. VPD map 66 represents a mapping of the VPDs 64 to the physical storage of the underlying storage devices. Configuration data (CFG DATA) 68 includes a number of settings or parameters that define, for example, the number of VPDs and any groupings for the drives. Controller 6 may also store the associated VPD map 66 and CFG DATA 68, or at least copies thereof, within the storage area 60 for persistency. Controller 6 may also maintain copies within internal memory 22 for accelerating processing of storage access requests.

Figure 9:
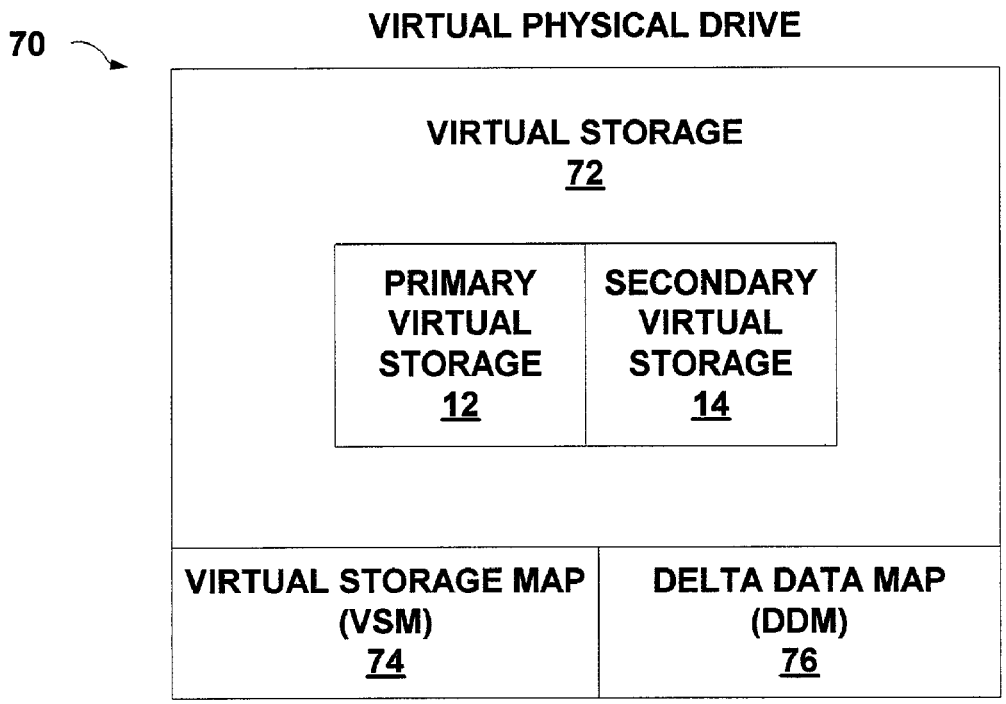
FIG. 9 is a block diagram illustrating an example configuration of a virtual physical drive in further detail.

FIG. 9 is a block diagram illustrating an example virtual physical drive 70 in further detail. In particular, virtual physical drive 70 is configured to include dynamic virtual storage 72 to save and restore data within a computing environment. PVD 70 includes virtual storage 72 that is used to maintain primary virtual storage 12 and secondary virtual storage 14 for the respective VPD 70.

As described in detail herein, controller 6 uses primary virtual storage 12 to store an initial state of data written processor 10 prior to a point in time, referred to herein as time $T_0$. In other words, primary virtual storage 12 stores a complete image of the data at time $T_0$. Controller 6 uses secondary virtual storage 14 to store all data written by processor 10 subsequent to time $T_0$. Consequently, controller 10 responds to read requests received from processor 10 by selectively reading data from secondary virtual storage 14 and primary virtual storage 12, depending on whether data stored by primary virtual storage 12 has been rendered obsolete by data stored by secondary virtual storage 14.

Controller 6 provides the ability to quickly create a new complete image of the data by dynamically reallocating primary virtual storage 12 and secondary virtual storage 14. In particular, controller 6 maintains a virtual storage map (VSM) 74 that defines the allocation of the primary and secondary virtual storage within virtual physical drive 70.

VSM 74 defines a set of logical storage units within each of primary virtual storage 12 and secondary virtual storage 14. The units may correspond to ranges of addresses, data blocks, sectors, or other units of storage within virtual storage 72 of VPD 70. In one embodiment, VSM 74 comprises a bitmap containing a set of binary values. Each binary value corresponds to a respective storage unit. A binary value of 1, for example, may indicate that the corresponding storage unit is allocated to primary virtual storage 12. A binary value of 0, however, may indicate that the storage unit is allocated to secondary virtual storage 14. Controller 6 may easily reallocate a storage unit from one virtual storage to another by changing a state of the corresponding binary value of VSM 74.

By adjusting VSM 74, controller 6 can quickly reallocate primary virtual storage 12 to include the data written to secondary virtual storage 14, thereby establishing a new time $T_0$ for primary virtual storage 12. Consequently, controller 6 can quickly backup data by dynamically reallocating virtual storage, such as by adjusting VSM 74. In this manner, the system can backup data in a manner that appears almost instantaneous to the user. The user, therefore, need not refrain from using the computing device for a significant period of time, as is often required by conventional backup mechanisms.

VPD 70 further includes a delta data map (DDM) 76 to record the locations of data written to secondary virtual storage 14. In one embodiment, DDM 76 comprises a bitmap having a set of binary values. Each binary value of the set corresponds to a logical storage unit within secondary virtual storage 14, and indicates whether data has been written to secondary virtual storage 14 subsequent to a time $T_0$. In this manner, controller 6 can readily determine whether to read data from secondary virtual storage 14 or from primary virtual storage 12 based on the DDM.

Figure 10:
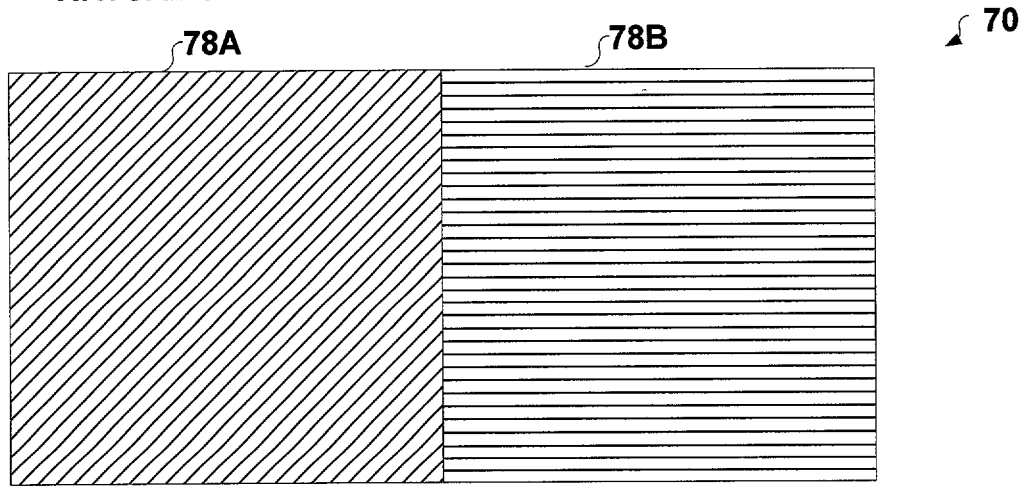
FIG. 10 illustrates an example mapping of a primary virtual storage and a secondary virtual storage to a virtual physical drive at a time $T_0$.

FIG. 10 illustrates an example mapping of primary virtual storage 12 and secondary virtual storage 14 to virtual physical drive 70 at a time $T_0$. In particular, FIG. 10 illustrates the initial allocation of primary virtual storage 12 and secondary virtual storage within the virtual physical drive 70. In this example, VSM allocates two storage regions 78A, 78B within virtual storage 72. Initially, primary virtual storage 12 is entirely allocated to storage region 78A. Similarly, secondary virtual storage 14 is entirely allocated to storage region 78B.

Figure 11:
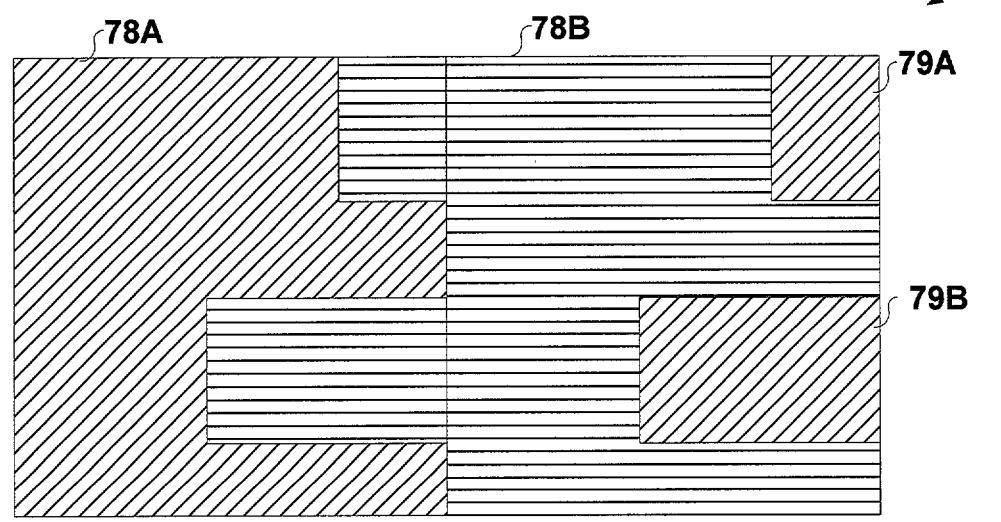
FIG. 11 illustrates the same virtual storage at time a new time $T_0$ after the controller has performed a save operation, thereby dynamically reallocating the primary and secondary virtual storage.

FIG. 11 illustrates the same storage regions 78 at time a new time $T_0$ after controller 6 has performed a save operation, thereby dynamically reallocating primary and secondary virtual storage of the VPD 70 and establishing a new $T_0$ state. In particular, primary virtual storage 12 comprises a substantial portion of storage region 78A, but has been reallocated to include portions of storage region 78B.

Specifically, regions 79A and 79B of storage region 78B have been dynamically reallocated to primary virtual storage 12. Similarly, the corresponding regions within storage region 78A have been allocated to secondary virtual storage 14. As illustrated, primary virtual storage 12 and secondary virtual storage 14 may be distributed throughout the virtual physical drive as a result of allocation and reallocation due to save commands. As described in further detail below, by reallocating the primary and secondary virtual storage within the virtual physical drive, controller 6 is able to quickly perform a save operation in a manner that appears instantaneous to the user.

Figure 12:
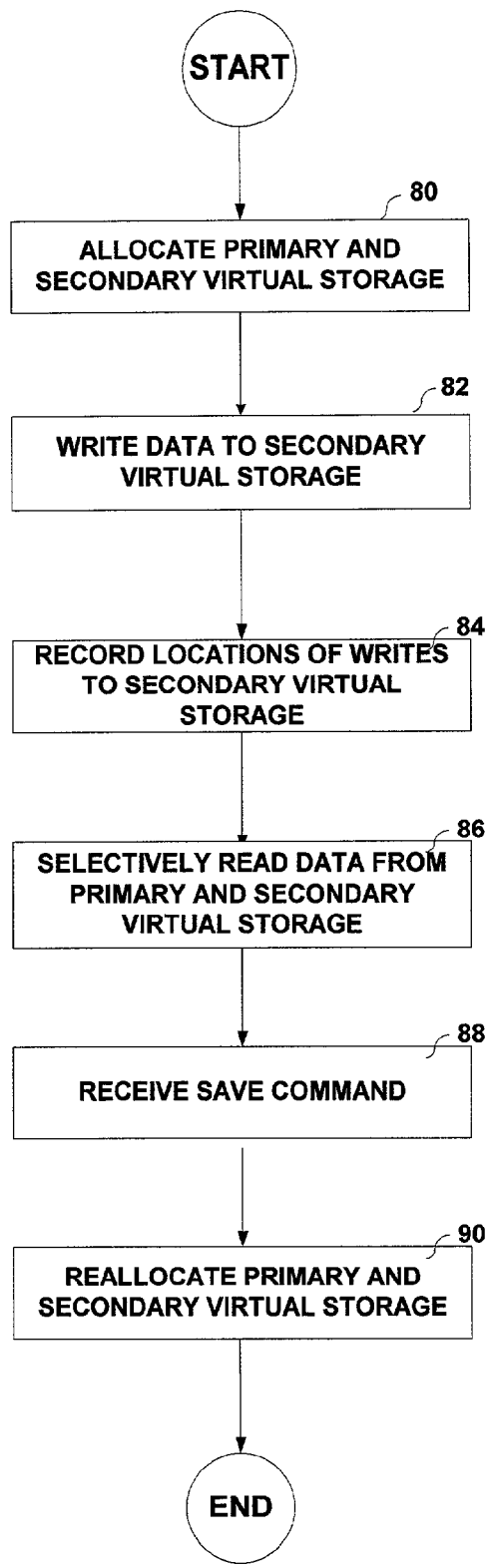
FIG. 12 is a flowchart illustrating a high-level overview of the functions performed by the controller to backup a virtual physical drive in a manner that appears substantially instant to a user.

FIG. 12 is a flowchart illustrating a high-level overview of the functions performed by controller 6 to backup a virtual physical drive in a manner that appears substantially instant to a user. Initially, controller 6 allocates primary virtual storage 12 and secondary virtual storage 14 within storage system 8 (80). In this manner, controller 6 defines an initial state at a time $T_0$ for primary virtual storage 12 and secondary virtual storage 14. After allocating virtual storage 12, 14 for the VPD, controller 6 writes all data received from processor 10 to secondary virtual storage 14 (82).

Controller 6 maintains a record, e.g., DDM 76, of the locations to which data has been written to secondary virtual storage 14 subsequent to time $T_0$ (84). Controller 6 makes use of this record in order to respond to read requests received from processor 10. Specifically, upon receiving a read request, controller 6 selectively reads data from primary virtual storage 12 and secondary virtual storage 14 based upon the record (86). For example, if the record indicates that the requested data has been written subsequent to time $T_0$, controller 6 reads the data from secondary virtual storage 14 and forwards the data to processor 10. Otherwise, controller 6 reads the data from primary virtual storage 12 and forwards the data to processor 10.

Upon receiving a save command (88), controller 6 reallocates primary virtual storage 12 and secondary virtual storage 14 (90). In particular, controller 6 reallocates the virtual storage space such that data written to secondary virtual storage 14 subsequent to the time $T_0$ is allocated to primary virtual storage 12 and excluded from secondary virtual storage 14. In addition, controller 6 clears the record of data written to secondary virtual storage 14, i.e., clears DDM 76. In this manner, controller 6 establishes a new time $T_0$ in response to the save command.

Figure 13:
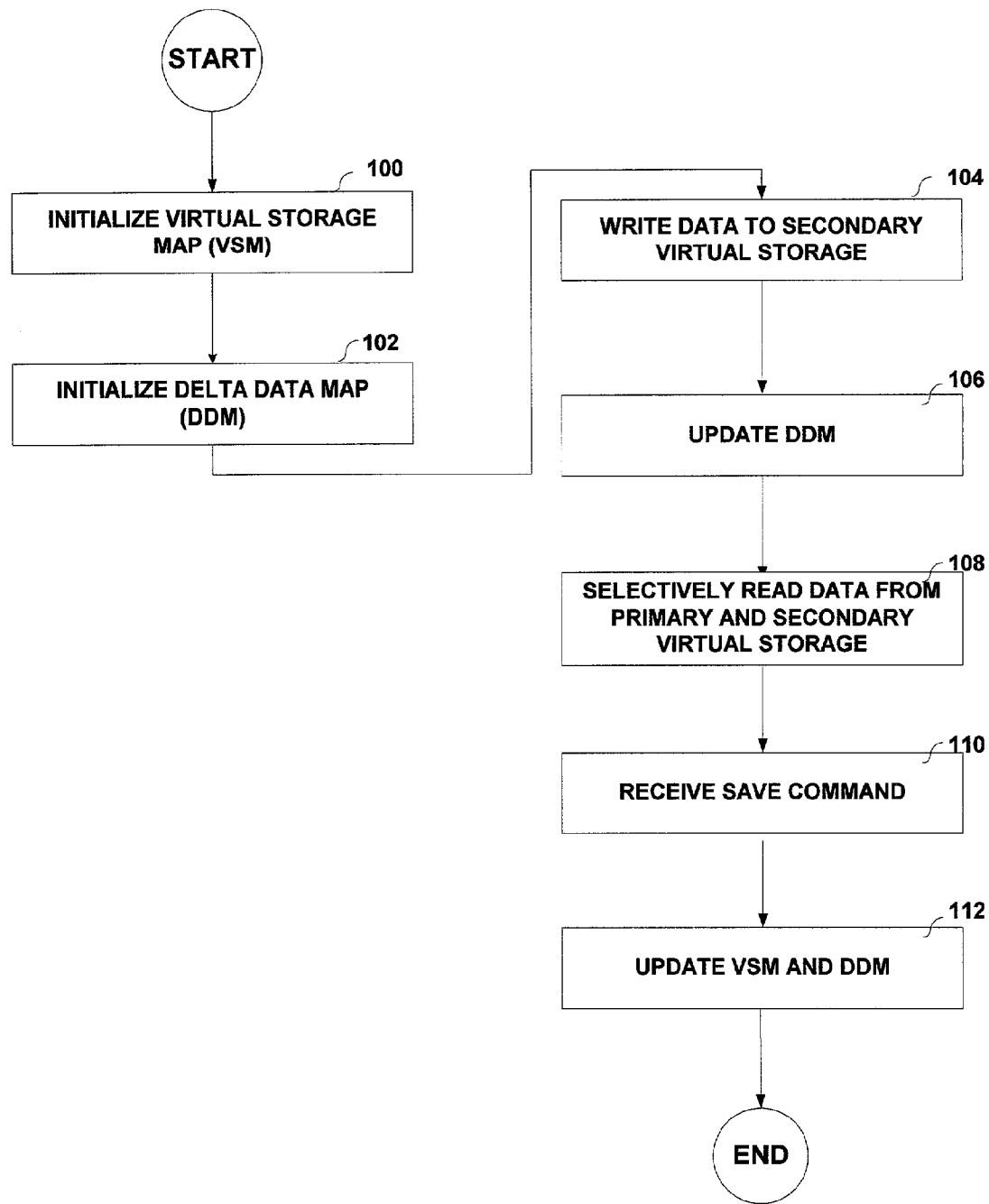
FIG. 13 is a flowchart further illustrating an exemplary process of dynamically allocating the virtual storage of a virtual physical drive.

FIG. 13 is a flowchart further illustrating the dynamic allocation of virtual storage 12, 14 of a virtual physical drive. Initially, controller 6 initializes virtual storage map (VSM) 74 to allocate primary virtual storage 12 and secondary virtual storage 14 (100). Controller 6 may, for example, initialize all of the binary values of VSM 74 to a null value, thereby allocating all storage units of primary virtual storage 12 to a first logical storage volume and all of the storage units of secondary virtual storage 14 to a second logical storage volume. FIG. 10, as described above, illustrates an example initial allocation of primary virtual storage 12 and secondary virtual storage 14.

Next, controller 6 initializes the delta data map (DDM) 76 by setting all of the binary values to a null value (102). In this manner, controller 6 resets DDM 76 to indicate that no data has yet been stored to secondary virtual storage 14 subsequent to the allocation. Next, controller 6 writes data to secondary virtual storage 14 in response to write requests received from processor 10 (104). After writing the data, controller 6 updates DDM 76 to record the locations of the data written to secondary virtual storage 14 (106). In particular, controller 6 may change the state of the corresponding binary values within DDM 76 from a null value to a logical one, thereby marking the storage units as containing data written subsequent to time $T_0$.

Upon receiving a read request from processor 10, controller 6 selectively reads data from primary virtual storage 12 and secondary virtual storage 14 based upon the state of the binary data within DDM 76 (108). More specifically, controller 6 reads the appropriate binary values of DDM 76 to determine whether the data requested by processor 10 has been written to secondary virtual storage 14. If so, controller 6 reads the data from secondary virtual storage 14 and forwards the data to processor 10. If, however, the data has not been written from processor 10 subsequent to a time $T_0$, controller 6 reads the data from primary virtual storage 12 and forwards the data to processor 10.

Upon receiving a save command (110), controller 6 reallocates primary virtual storage 12 and secondary virtual storage 14 by updating VSM 74 and DDM 76 (112). In general, controller 6 examines DDM 76 to identify those storage units within secondary virtual storage 14 that contain data written by processor 10 subsequent to time $T_0$. Controller 6 then updates VSM 74 to reallocate primary virtual storage 12 to include the identified storage units of secondary virtual storage 14 (112). In this manner, the storage units of secondary virtual storage 14 that contain data written subsequent to time $T_0$ are redefined to be included within primary virtual storage 12. Consequently, the corresponding storage units within primary virtual storage 12 that contain old data are automatically redefined to be included within secondary virtual storage 14. Controller 6 resets DDM 76 by setting all of the binary values to null. In this manner, controller 6 marks all of the storage units within secondary virtual storage 14 as being initialized and available to store new data. In this manner, controller 6 establishes a new time $T_0$ for the virtual physical drive.

Figure 14A:
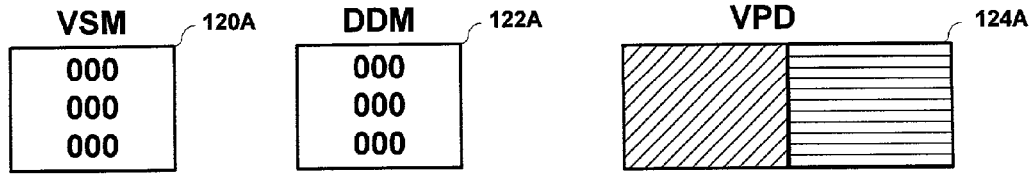
FIGS. 14A–14E illustrate in further detail the process of dynamically reallocating virtual storage of a virtual physical drive to save data in a manner that appears instantaneous to a user.

FIGS. 14A–14E illustrate in further detail the process of dynamically reallocating virtual storage of a virtual physical drive to save data in a manner that appears instantaneous to a user. FIG. 14A illustrates an initial state in which VSM 120A is reset such that primary virtual storage 12 is mapped entirely to a first storage region of the virtual storage, and secondary virtual storage 14 is mapped entirely to a second storage region of the virtual physical drive (VPD). In addition, DDM 122A is initialized to indicate that secondary virtual storage 14 of VPD 124 currently contains no data written subsequent to a time $T_0$.

Figure 14B:
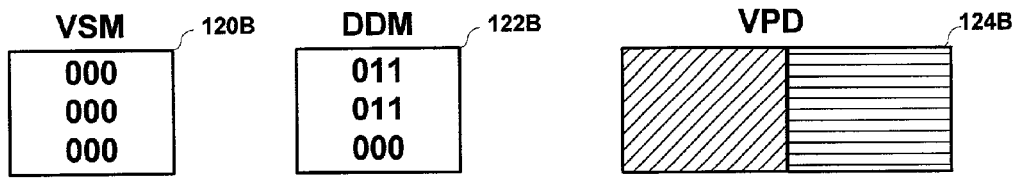

FIG. 14B illustrates the changes to DDM 122 after a number of write requests from processor 10. In particular, DDM 122B indicates that 4 storage units of secondary virtual storage 14 contain data that has been written subsequent to initial state of time $T_0$.

Figure 14C:
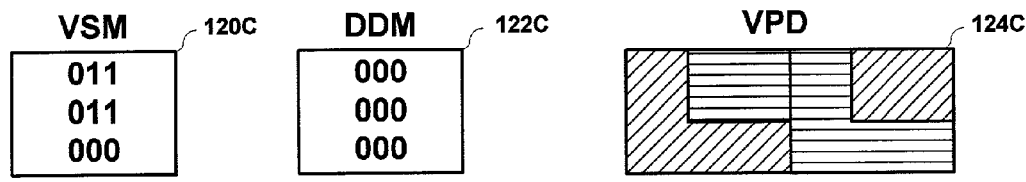

FIG. 14C illustrates the changes to VSM 120C and DDM 122C made by controller 6 in response to receiving a save command from a user, such as a system administrator. In particular, controller 6 identifies the storage units of DDM 122B that store data written subsequent to time $T_0$. Controller 6 then modifies VSM 120C to reallocate primary virtual storage 12 and secondary virtual storage 14. In particular, controller 6 modifies the corresponding binary elements of VSM 120C such that primary virtual storage 12 includes those storage units of secondary virtual storage 14 to which data has been written subsequent to time $T_0$. Controller 6 may quickly and efficiently effect this dynamic reallocation by performing an exclusive-or (XOR) operation between DDM 122C VSM 120C.

Figure 14D:
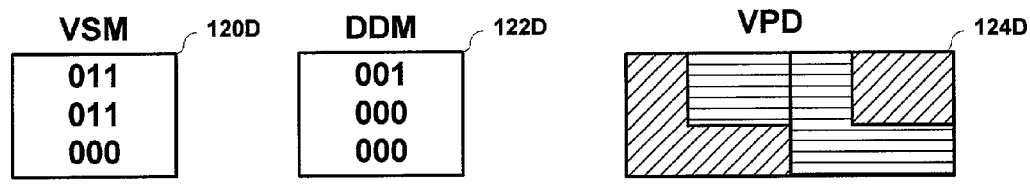

FIG. 14D illustrates the changes made to DDM 122D upon receiving an additional write request from processor 10. In particular, controller 6 writes the data to secondary virtual storage 14 and update DDM 122D.

Figure 14E:
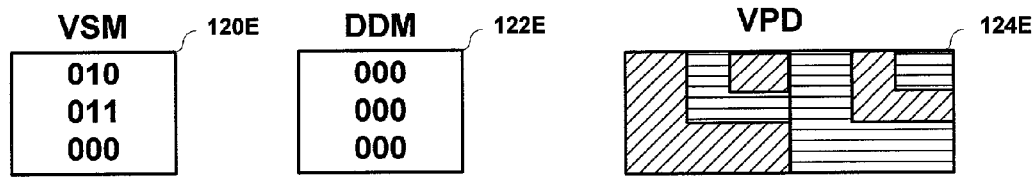

FIG. 14E illustrates the changes made by controller 6 in response to a second save command. In particular, controller 6 updates VSM 120E to reallocate primary virtual storage 12 and secondary virtual storage 14, and clears DDM 122E.

Figure 15:
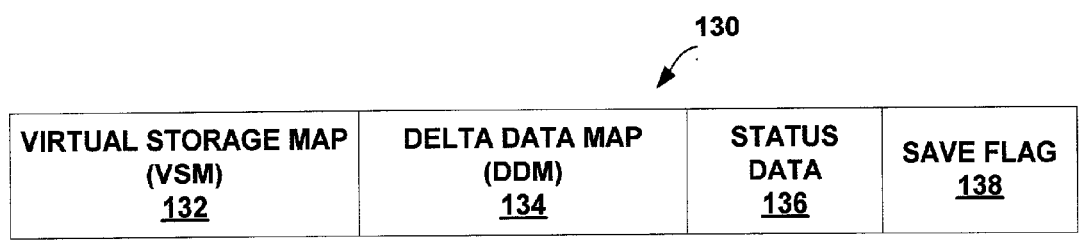
FIG. 15 is a block diagram illustrating another embodiment of a data structure maintained by the controller to allocate the virtual storage and to record locations of data written to the secondary virtual storage.

FIG. 15 is block diagram illustrating another example data structure 130 maintained by controller 6 for dynamically allocating and reallocating virtual storage. In this embodiment, data structure 130 includes VSM 132, DDM 134 and additional status data 136. In particular, status data 136 indicates whether each storage unit of secondary virtual storage 14 needs to be reallocated after a save command. Save flag 138 represents a whether a save is pending and must be performed.

Status data 136 may comprise a bitmap having a set of binary values. Each binary value may correspond to a storage unit within secondary virtual storage 14. The state of the binary value represents whether the corresponding storage unit has been reallocated, if necessary, in response to a recent save command. In this manner, data structure 130 may be useful when controller 6 performs the reallocation in the background, such as during free cycles of a system bus within a host computing device. Thus, by including status data in the data structure, the reallocation can be performed solely during free cycles. If the free cycles are interrupted, status data 136 can maintain an indication of the status of the reallocation so that it can be finished during subsequent free cycles. In this manner, controller 6 can perform reallocation without using non-free cycles.

Figure 16:
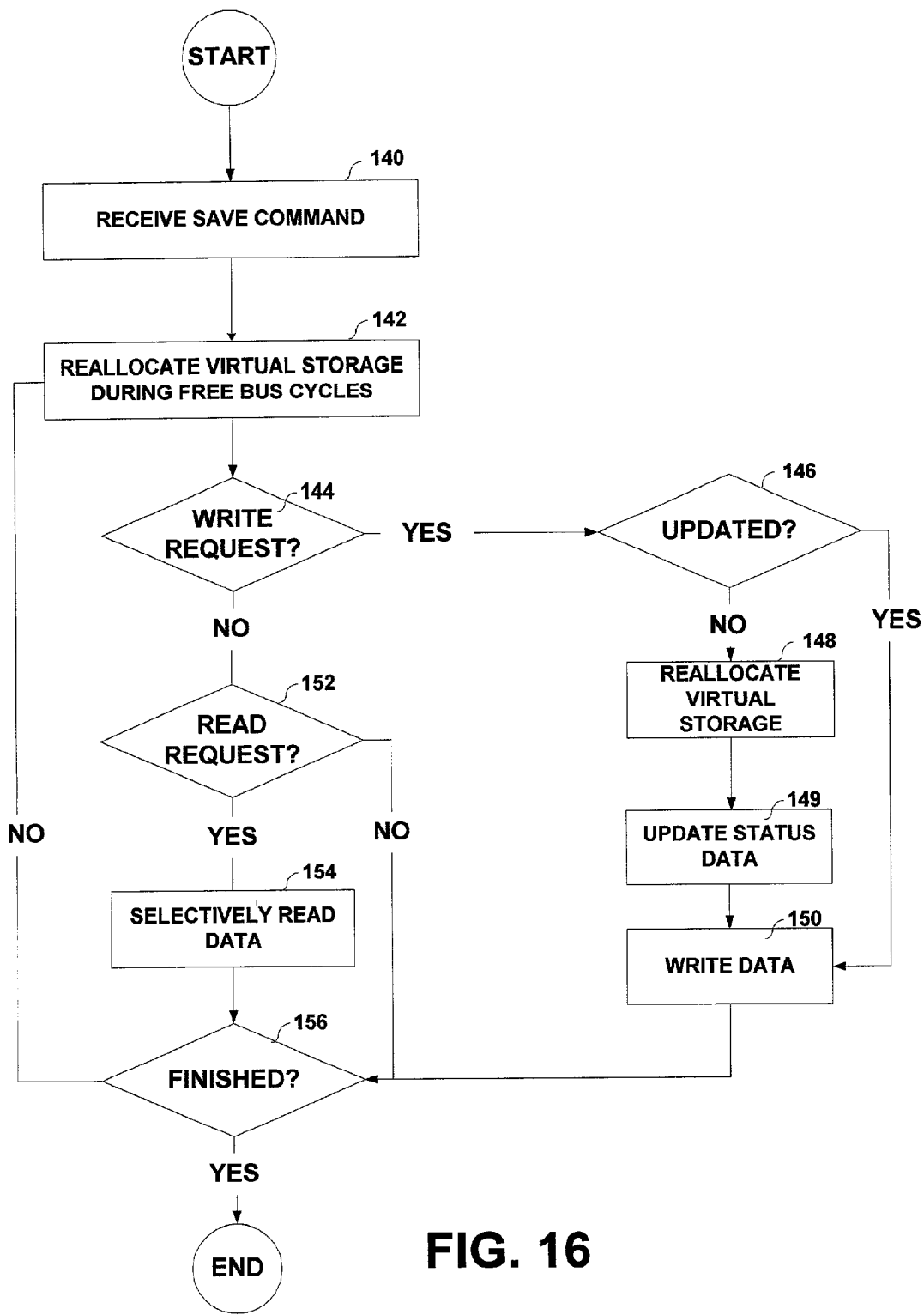
FIG. 16 is a flowchart illustrating the controller backing up data by dynamically reallocating virtual storage using the data structure of FIG. 15.

FIG. 16 is a flowchart illustrating the reallocation of virtual storage by controller 6 when making use of data structure 130. Upon receiving a save command (140), controller 6 sets a global flag 138 indicating that a save must be performed and begins updating VSM 132 and DDM 134 during the background, i.e., between servicing of access requests received from processor 10 (142). Upon reallocating a storage unit, controller 6 sets the value of a corresponding bit within status data 136 to indicate that reallocation has either been performed or is not needed.

During this process, if controller 6 receives a write request (144), controller 6 accesses status data 136 to determine whether the storage units holding the requested data have been updated in response to the previous save command (146). If so, controller 6 immediately writes the data to the storage units of secondary virtual storage 14 (150). If not, controller 6 updates VSM 132 and DDM 134 (148) and status data 136 (149) prior to writing the data (150).

If a read request is received (152), controller 6 selectively reads data from primary virtual storage 12 and secondary virtual storage 14 in accordance with DDM 134 as described above (154). Controller 6 continues to update status data 136 in the background until all of the storage units containing data written subsequent to time $T_0$ have been reallocated from secondary virtual storage 14 to primary virtual storage 12 (156).

Figure 17:
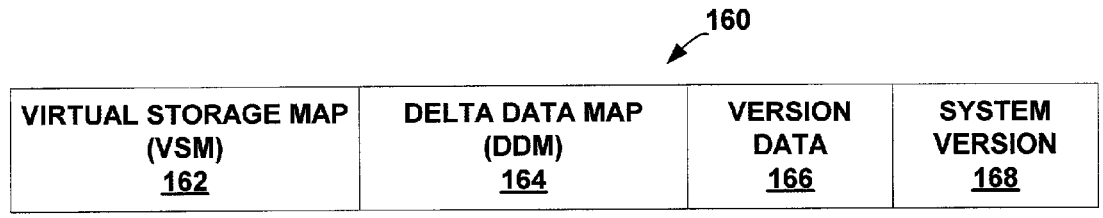
FIG. 17 is a block diagram illustrating another embodiment of a data structure maintained by the controller to allocate the virtual storage and to record locations of data written to the secondary virtual storage.

FIG. 17 is a block diagram illustrating another embodiment of a data structure 160 maintained by controller 6 for dynamically allocating and reallocating virtual storage. In this embodiment, data structure 160 includes VSM 162, DDM 164, version data 166 and a system version 168. In particular, version data 166 stores a version number for each storage unit of secondary virtual storage 14. More specifically, the version number corresponds to a save command received by controller 6, and indicates whether the storage unit is up to date. System version 168 stores the most recent version for all of secondary virtual storage 14, and is based upon the save commands received from I/O device 26. In particular, each time controller 6 receives a save command, controller 6 increments system version 168.

Figure 18:
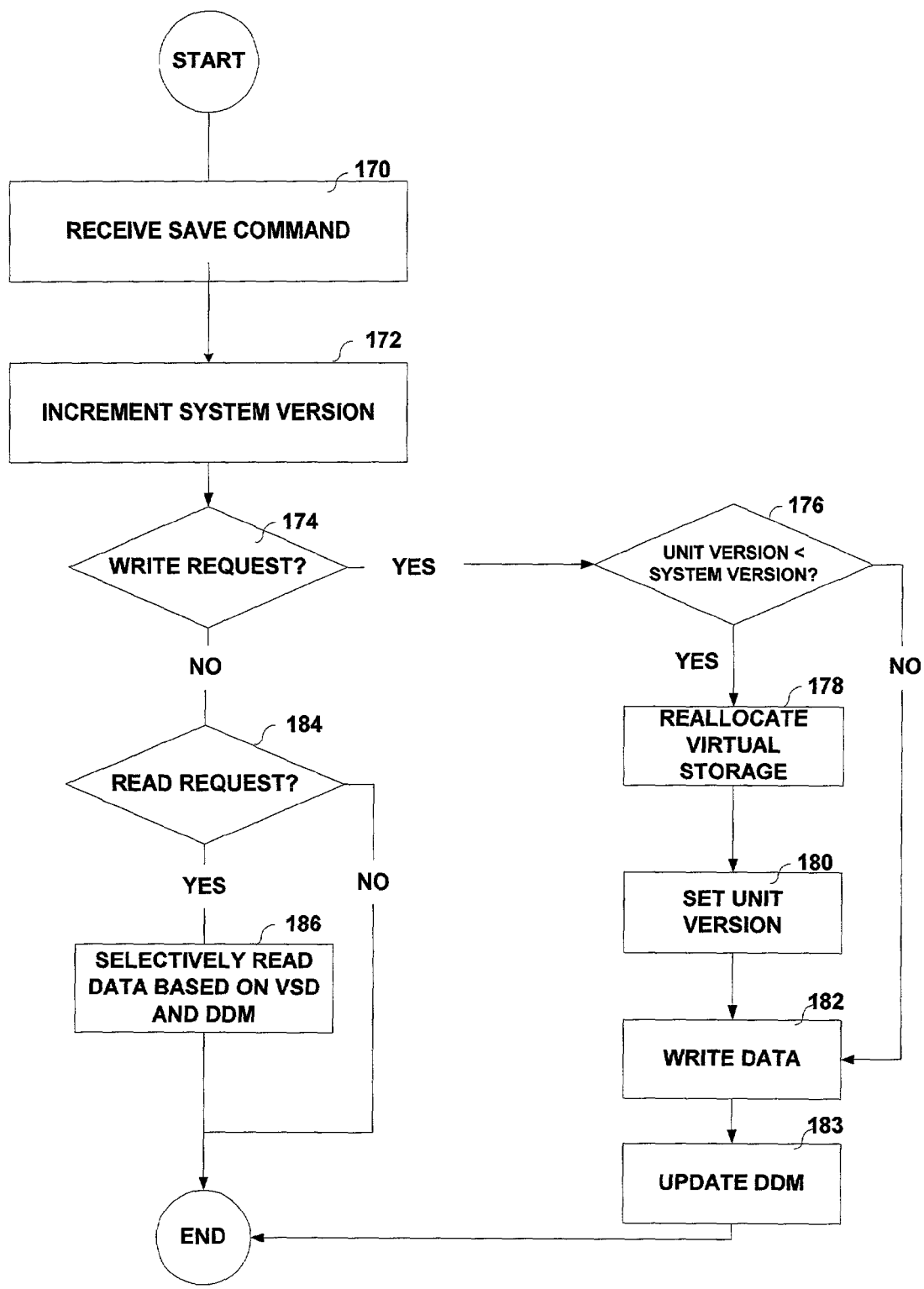
FIG. 18 is a flowchart illustrating the controller backing up data by dynamically reallocating virtual storage using the data structure of FIG. 17.

FIG. 18 is a flowchart illustrating the operation of controller 6 when using data structure 160 of FIG. 17. Upon receiving a save command (170), controller 6 increments the system version 168 (172). Upon receiving a write request (174) controller 6 compares the version for the requested storage unit, as indicated by version data 166, with the system version 168 (176).

If the version number for the requested storage unit is less than system version 168, controller 6 initiates a reallocation of the storage unit from secondary virtual storage 14 to primary virtual storage 12 (178) and sets the version number for the storage unit to system version 168 (180). Next, controller 6 writes the data to the storage unit of secondary virtual storage 14 (182) and updates DDM 164 to indicate that the storage unit contains data subsequent to the last save command (183).

If however, the version number for the storage unit requested is equal to system version 168, controller 6 writes the data to secondary virtual storage 14 (182) without updating VSM 162 to reallocate storage units (182) and updates DDM 164 (183). If controller 6 receives a read request, controller 6 accesses DDM 164 and selectively reads data from secondary virtual storage 14 and primary virtual storage 12 (186).

Figure 19:
FIG. 19 is a block diagram illustrating another embodiment of a data structure maintained by the controller to allocate the virtual storage.

FIG. 19 is a block diagram illustrates another embodiment of a data structure 190 maintained by controller 6 for dynamically allocating and reallocating virtual storage of a virtual physical drive. In this embodiment, data structure 190 includes VSM 192, DDM 194, version data 196, command history 198 and a system version 200. In particular, command history 198 comprises a log indicating the sequence of save and restore commands received be controller 6. Command history 198 may comprise, for example, a bitmap in which a binary value of one represents a save command and a binary value of zero represents a restore command. A sequence of 11101, for example, represents the following sequence: SAVE, SAVE, SAVE, RESTORE, SAVE.

In this embodiment, version data 196 may store an index into command history 198. In this manner, the version number indicates the last command, save or restore, applied to a particular storage unit of secondary virtual storage 14. In other words, by indexing into command history 148, the version number indicates a current state for the respective storage unit.

Upon receiving a read request from processor 10, controller 6 accesses version data 196 to determine if the version for the accessed storage unit is less than system version 200. If so, controller 6 reallocates VSM 192 and updates the version data 196 for the accessed storage unit. In this manner, controller 6 may update data structure 190 within local memory 22. For write requests, controller 6 may perform a similar operation and save data structure 190 to storage system 8.

Upon receiving a save or restore command, controller 6 may update command history 198 to reflect the command, save data structure 190 to storage system 8, and increment system version 200. This allows controller 6 to perform a save or restore for a virtual physical drive in a manner that appears instantaneous to the user.

The features described herein may be implemented in a wide variety of computing environments. Consider, for example, a laptop computer incorporating the features described herein. A common problem with conventional laptops is that corruption of the hard drive may render the device unusable for a substantial period while the user completes his or her travel. In other words, the laptop typically is unusable until the user returns such that an IT staff member can service the laptop.

By incorporating the features described herein, the laptop may be configured with one or more virtual physical drives that are readily protected from viruses or other malicious software. Furthermore, in the event of such a recurrence, one or more of the VPDs may be restored to an operating state prior to the corruption.

For example, controller 6 may be incorporated within the laptop, and may map a first and second VPD to the storage space presented by the hard drive. The first drive may be configured as a boot drive and may store application software, such as word processing and other software executables. This VPD may be further configured to support dynamic virtual storage for purposes of backup and restore. The second drive may be used to store the data files used by the application. Accordingly, in the event of corruption, the first drive may be instantly restored to operation by reallocating the primary and secondary virtual storage. Virus protection software may then be run on the second drive, thereby allowing the user to quickly retrieve data files without losing significant work product, including work product generated during the trip subsequent to the last backup of the first VPD. Alternatively, both the first and second VPD may be configured for backup and restoration.

As another example, the features may readily be incorporated into a server, such as a file server for an office environment. As with the laptop environment, controller 6 may map a first and second VPD to the storage space presented by the server. The first drive may be configured as a boot drive and may store application software, such as conventional server management software. This VPD may be further configured to support dynamic virtual storage for purposes of backup and restore. The second drive may be used to store the data files for the office. In the event of corruption, the first drive may be instantly restored to full operation by reallocating the primary and secondary virtual storage. Virus protection software may then be run on the second drive, thereby allowing the office to quickly retrieve data files without experiencing significant loss of productivity.

By only configuring the first VPD for restoration and backup, controller 6 can make use of the vast majority of the storage space of the server for use as primary virtual storage. For example, the first VPD that stores that application software may be allocated to consume 1 gigabyte or less of storage space, while the second VPD may be allocated to consume the remainder, which may easily comprise 100 gigabytes or more of space. The configuration of the first VPD for instant backup and restore results in only 2 gigabytes of total space, i.e., 1 gigabyte for each of the primary and secondary virtual storage. This inefficiency is avoided for the second VPD, allowing nearly all of the storage space of the server to be used for primary virtual storage. Alternatively, if the user elects, both the first and second VPD of the server may be configured for backup and restoration, thereby allowing for the immediate restoration of both virtual physical drives.

The training environment is another example of an environment that may readily benefit from the features described herein. In such an environment, a VPD may easily be created for each user of a class. A user can instantly restore each VPD to a know operating state after the training session by simply pressing the restore button, resulting in the dynamic reallocation of primary and secondary virtual storage for each of the VPDs.

Various embodiments of the invention have been described. These and other embodiments are within the scope of the following claims.

The invention claimed is:

1. A method comprising:
mapping addressable storage units of a set of virtual physical drives to addressable storage units of a set of physical storage media;
storing data received from a host computer prior to a time $T_0$ on a primary virtual storage within the addressable storage units of the virtual physical drives;
storing data received from the host computer after time $T_0$ on a secondary virtual storage within the addressable storage units of the virtual physical drives; and
responding to storage access requests from a processor of the a host computer such that the virtual physical drives appear to the processor as physically independent drives.

2. The method of claim 1, wherein each access request specifies one or more addresses for one of the virtual physical drives, the method further comprising:
translating the specified addresses to addresses for the physical storage media in accordance with the mapping; and
accessing the set of physical storage media in accordance with the translated addresses.

3. The method of claim 1, further comprising:
receiving from a user a selection of a group of one or more of the virtual physical drives; and
rejecting storage access commands from the processor requesting access to virtual physical drives not within the selected group.

4. The method of claim 3, further comprising:
authenticating the user; and
accessing the addressable storage units of the selected virtual physical drives based upon the authentication.

5. The method of claim 3, further comprising:
reporting at least one of the virtual physical drives as a swappable drive to an operating system executing on the processor; and
updating the group to include the swappable virtual physical drive in response to input from the user.

6. The method of claim 1, further comprising storing the mapping in a computer-readable medium coupled to the host computing device.

7. The method of claim 1, further comprising storing the mapping in an embedded memory of a controller coupled to the host computing device via an input/output (I/O) bus.

8. A method comprising:
mapping addressable storage units of a set of virtual physical drives to addressable storage units of a set of physical storage media;
storing data received from a host computer prior to a time $T_0$ on a primary virtual storage within the addressable storage units of the virtual physical drives;
storing data received from the host computer after time $T_0$ on a secondary virtual storage within the addressable storage units of the virtual physical drives;
intercepting access requests on an interface bus from a processor of the host computer to access the storage units of the virtual physical drives, wherein the each access request specifies one or more addresses for one of the virtual physical drives;
translating the specified addresses to addresses for the physical storage media in accordance with the mapping; and
issuing access requests to access the set of physical storage media in accordance with the translated addresses.

9. The method of claim 8, further comprising:
receiving a save command at the time $T_0$; and
establishing a $T_0$ state in response to the save command in which data received from the host computer prior to time $T_0$ is stored on the primary virtual storage and data received from the host computer after time $T_0$ is stored on the secondary virtual storage.

10. The method of claim 8, further comprising:
receiving a restore command subsequent to the time $T_0$; and
disregarding the data received from the host computer after the time $T_0$ in response to the restore command.

11. A method comprising:
generating a virtual physical drive (VPD) map that associates addressable storage units of a virtual physical drive to addressable storage units of a physical storage medium;
generating a virtual storage map (VSM) to allocate a primary virtual storage and a secondary virtual storage within the virtual physical drives;
storing data received from a host computer prior to a time $T_0$ on the primary virtual storage;
storing data received from the host computer after time $T_0$ on the secondary virtual storage;
maintaining a record of the data stored on the secondary virtual storage; and
selectively reading data from the primary virtual storage and the secondary virtual storage based on the record.

12. The method of claim 11, further comprising reporting the virtual physical drive as read-only.

13. The method of claim 11, further comprising reporting at least one of the primary virtual storage and the second virtual storage as a virtual physical drive.

14. The method of claim 11, wherein maintaining a record comprises:
defining a delta data map (DDM) having a status bit for corresponding storage units for the primary and secondary virtual storage; and
setting the status bits of the delta data map to indicate whether data has been written to the storage units of the secondary virtual storage.

15. The method of claim 11, further comprising:
receiving a save command at time $T_0$; and
establishing a $T_0$ state for the virtual physical drive in response to the save command in which data received from the host computer prior to time $T_0$ is stored on the primary virtual storage and data received from the host computer after time $T_0$ is stored on the a secondary virtual storage.

16. The method of claim 15, further comprising:
receiving a restore command from a restore hardware switch subsequent to time $T_0$; and
disregarding the data received from the host computer after time $T_0$ in response to the restore command.

17. The method of claim 11, further comprising updating the VSM to reallocate the primary virtual storage to include data written to the secondary virtual storage.

18. The method of claim 17, wherein updating the VSM comprises updating the VSM to reallocate at least one storage unit from the secondary virtual storage to the primary virtual storage device.

19. The method of claim 11, wherein the VSM allocates a set of storage units for the primary and the secondary virtual storage, and wherein maintaining a record comprises storing a delta data map (DDM) to indicate those storage units of the secondary virtual storage to which the data has been written.

20. The method of claim 19, wherein the DDM and the VSM comprises bitmaps having a set of binary values, wherein each binary value corresponds to a respective storage unit, and further wherein updating the VSM includes changing a state of at least one of the binary values.

21. The method of claim 11, when updating the VSM comprises:
receiving a save command at a time Ts where $Ts>T_0$; and
in response to the save command, updating the VSM to redefine the primary virtual storage to include the data written to the secondary virtual storage device after $T_0$.

22. The method of claim 21, wherein updating the VSM comprises:
setting each bit of the VSM bitmap based upon an exclusive or operation (XOR) of the binary value of VSM bit and a corresponding bit within the DDM; and
clearing the corresponding bit within the DDM.

23. An apparatus comprising:
a control unit;
a computer-readable medium to store a virtual physical drive (VPD) map that associates addressable storage units of a set of virtual physical drives to addressable storage units of a set of physical storage media of a storage system; and
a first interface to couple the control unit to a processor of a host computer via a bus,
wherein the control unit receives storage access requests from the processor and controls the physical storage media according to the VPD map such that the virtual physical drives appear to the processor as physically independent drives,
wherein the control unit stores a virtual storage map (VSM) on the computer-readable medium to allocate a primary virtual storage and a secondary virtual storage within one or more of the virtual physical drives,
wherein the control unit stores data received from the host computer prior to a time $T_0$ on a primary virtual storage within the addressable storage units of the virtual physical drives and stores data received from the host computer after time $T_0$ on a secondary virtual storage within the addressable storage units of the virtual physical drives, and
wherein the control unit maintains a record of the data stored on the secondary virtual storage of the virtual physical drives and selectively reads data from the primary virtual storage and the secondary virtual storage based on the record.

24. The apparatus of claim 23, further comprising a second interface coupling the control unit to the storage system.

25. The apparatus of claim 23, wherein the first interface couples the control unit to the storage system.

26. The apparatus of claim 23, wherein the each access request specifies one or more addresses for one of the virtual physical drives, and the control unit translates the specified addresses to addresses for the physical storage media in accordance with the VPD map and the VSM, and accesses the set of physical storage media in accordance with the translated addresses.

27. The apparatus of claim 23, wherein the control unit stores configuration data defining a group of one or more of the virtual physical drives, and rejects storage access commands from the processor requesting access to virtual physical drives not within the group.

28. The apparatus of claim 27, wherein the control unit reports at least one of the virtual physical drives as a swappable drive to an operating system executing on the processor, and updates the group to include the swappable virtual physical drive in response to input from a user.

29. The apparatus of claim 23, wherein each access request specifies one or more addresses for one of the virtual physical drives, and the control unit translates the specified addresses to addresses for the physical storage media in accordance with the VSM and the VPD map and issues access requests to access the set of physical storage media in accordance with the translated addresses.

30. The apparatus of claim 23, further comprising an input/output (I/O) interface to receive a save command, wherein the control unit reallocates the primary virtual storage in response to the save command.

31. The apparatus of claim 30, wherein the I/O interface receives a signal from an actuated switch.

32. The apparatus of claim 30, wherein the I/O interface receives a wireless signal.

33. The apparatus of claim 30, wherein the I/O interface receives the save command from software executing on a computing device.

34. The apparatus of claim 23, wherein the VSM allocates a set of storage units for the primary and the secondary virtual storage, and further wherein the control unit reallocates at least one storage unit from the secondary virtual storage to the primary virtual storage device in response to a save command.

35. A host computer comprising:
a processor;
a storage system having one or more physical storage devices; and
a controller coupled to the processor and the storage system to maintain a virtual physical drive (VPD) map associating addressable storage units of a set of virtual physical drives to addressable storage units of a set of physical storage media of a storage system,
wherein the controller receives storage access requests from the processor and controls the physical storage media according to the VPD map such that the virtual physical drives appear to the processor as physically independent drives, wherein the control unit stores a virtual storage map (VSM) on the computer-readable medium to allocate a primary virtual storage and a secondary virtual storage within one or more of the virtual physical drives, wherein the control unit stores data received from the host computer prior to a time $T_0$ on a primary virtual storage within the addressable storage units of the virtual physical drives and stores data received from the host computer after time $T_0$ on a secondary virtual storage within the addressable storage units of the virtual physical drives, and wherein the control unit maintains a record of the data stored on the secondary virtual storage of the virtual physical drives and selectively reads data from the primary virtual storage and the secondary virtual storage based on the record.

36. The host computer of claim 35, wherein each access request specifies one or more addresses for one of the virtual physical drives, and the control unit translates the specified addresses to addresses for the physical storage media in accordance with the VPD man and the VSM, and accesses the set of physical storage media in accordance with the translated addresses.

* * * * *